March 25, 1969  S. E. MILLER  3,434,774
WAVEGUIDE FOR MILLIMETER AND OPTICAL WAVES
Filed Feb. 2, 1965  Sheet 1 of 3

INVENTOR
S. E. MILLER
BY
ATTORNEY

# United States Patent Office

3,434,774
Patented Mar. 25, 1969

3,434,774
WAVEGUIDE FOR MILLIMETER AND OPTICAL WAVES
Stewart E. Miller, Middletown, N.J., assignor to Bell Telephone Laboratories, Incorporated, New York, N.Y., a corporation of New York
Continuation-in-part of application Ser. No. 347,211, Feb. 25, 1964. This application Feb. 2, 1965, Ser. No. 429,843
Int. Cl. G02b 5/14; H01p 3/20; H01q 13/00
U.S. Cl. 350—96                                            11 Claims

ABSTRACT OF THE DISCLOSURE

Efficient transmission of optical wave energy is achieved by controlling the dielectric constant of the wavepath. Specifically, the wave energy is guided by transversely tapering, or grading the dielectric constant of the wavepath from a maximum value at its center to a minimum value at the outer region of the wavepath. Two classes of waveguides are described. In the first class, the dielectric constant is tapered either continuously, or in discrete steps. In the second class of waveguides the dielectric constant at any particular longitudinal location along the guide does not have the desired tapered distribution. However, the effect of such a distribution is nevertheless realized over an extended longitudinal interval by continuously changing the symmetry of the wavepath. To avoid mode conversion effects, the wavepath is advantageously surrounded by a lossy jacket.

---

This application is a continuation-in-part of my copending application Ser. No. 347,211, filed Feb. 25, 1964, now abandoned.

Background of the invention

Means for generating electromagnetic waves in the infrared, visible and ultraviolet frequency ranges, hereinafter to be referred to collectively as optical wave, have been disclosed in United States Patent 2,929,922, issued to A. L. Schawlow et al. and in the copending United States application of A. Javan, Ser. No. 816,276 filed May 26, 1959, now abandoned. Wave energy generated in the manner explained by Schawlow et al. and by Javan is characterized by a high degree of monochromaticity and coherence. In addition, because of the very high frequency of wave energy in the optical portion of the frequency spectrum, such wave energy is capable of carrying enormous amounts of information and is, therefore, particularly useful as a carrier signal in a communication system. However, utilization of this great potential is dependent upon the availability of an efficient long distance transmission medium.

Experience has shown that the well-known waveguiding structures currently employed for guiding microwaves cannot be readily adapted for use at optical frequencies because they become impractically small at these higher frequencies. Thus, other structures must be devised which are physically orders of magnitude larger than the wavelength of the energy being guided.

Typical of the present day proposals for guiding optical waves over long distances are sequences of lenses or mirrors, highly reflective waveguides and dielectric waveguides. (See for example, A. G. Fox and Tingye Li, "Resonant Modes in a Maser Interferometer," Bell System Technical Journal, volume 40, March 1961, p. 453; G. D. Boyd and J. P. Gordon "Confocal Multimode Resonator for Millimeter Through Optical Wavelength Masers," Bell System Technical Journal, volume 40, March 1961, p. 489; G. D. Boyd and H. Kogelnik, "Generalized Confocal Resonator Theory," Bell System Technical Journal volume 41, July 1962, p. 1347; G. Goubau and F. Schwering, "On the Guided Propagation of Electromagnetic Wave Beams," Transactions of the Institute of Radio Engineers, AP–9, May 1961, p. 238; C. C. Eaglesfield, "Optical Pipeline: A Tentative Assessment," The Institute of Electrical Engineers, January 1962, p. 26; J. C. Simon and E. Spitz, "Propagation Guidée de Lumière Cohérente," Journal of Physical Radian, volume 24, February 1963, p. 147.)

Summary of the invention

In accordance with the present invention, efficient transmission of optical waves is achieved by controlling the dielectric constant of the wavepath. Specifically, the wave energy is guided by transversely tapering or grading the dielectric constant of the wavepath from a maximum value at its center to a minimum value at the outer region of the wavepath. The effect of this gradation in the dielectric constant of the wavepath is to concentrate the wave energy at the center of the path and away from the outer perimeter of the path.

Two classes of waveguides are disclosed. In the first class, the dielectric constant is tapered either continuously, or in discrete steps by means of a plurality of coaxial cylinders of low-loss materials having different dielectric constants. In one illustrative embodiment of the invention, four different materials are used. In another embodiment, a single rod is suspended within a hollow enclosure.

In this first class of waveguides, the requisite transverse distribution of the dielectric constant exists at all longitudinal locations along the guide. In the second class of waveguides to be described, the dielectric constant at any particular longitudinal location along the guide does not have the desired tapered distribution. However, the effect of such a distribution is nevertheless realized over an extended longitudinal interval by continuously changing the symmetry of the wavepath. In describing this class of waveguides, reference is made to an "effective" dielectric constant distribution. Such reference shall be understood to refer to the fact that over an extended distance the wave energy propagates as if the dielectric constant of the wavepath decreased with distance from the guide axis. The effective taper thus produced is gradual and continuous.

In a first illustrative embodiment of this second class of waveguides, the transverse variation in the effective dielectric constant of the wavepath is achieved by means of a twisted sheet of low-loss dielectric material. The sheet extends diametrically across the waveguide and is twisted about the guide axis in the longitudinal direction.

In other embodiments of the invention, the transverse cross-sectional configuration of an unloaded waveguide is designed to produce the equivalent of the presence of a dielectric sheet.

In each of the various embodiments of the invention, the wavepath is confined within a suitable enclosure to protect it from atmospheric disturbances and other deleterious effects.

Because the intensity of the wave energy is very low at the outer edges of the wavepath, the nature of the enclosure is of little importance in the case of a highly uniform and straight waveguide. Accordingly, in such a case, the enclosure could be made of either conductive material or of nonconductive material. The particular substance and shape of the enclosure would be based primarily upon practical considerations such as cost, manufacturing techniques and use.

It is recognized, however, that a wavepath will generally include either intentional or unintentional bends. As is typical in multimode waveguides, the presence of such bends tends to produce mode conversion which gives rise to conversion-reconversion distortion and other deleterious effects. To avoid these difficulties a lossy jacket is provided around the waveguide. At millimeter frequencies, this jacket comprises a lining of lossy dielectric material having a thickness that is greater than skin depth. At optical frequencies, the requisite loss can be provided either by surface treating the outer surface of the outermost dielectric cylinder of the waveguide so that it scatters the wave energy at the surface or, alternatively, the requisite loss can be provided by surface treating the inner surface of the protective enclosure so as to scatter wave energy at its surface.

It is to be understood that the instant invention and the embodiments to be described in greater detail hereinbelow, relate to transmission media for the transmission of wave energy from a source to some utilization means over extended distances, which typically would be measured in hundred or thousands of feet. The guiding structures are accordingly to be distinguished from prior art waveguide components using dielectric materials to produce phase delay, attenuation or polarization rotational effects over relatively short distances.

In addition, the transmission media to be described are characterized by cross-sectional dimensions which are large compared to the wavelength of the wave energy to be propagated therein. As such, their use at millimeter wave frequencies as well as at optical wave frequencies is contemplated.

These and other objects and advantages, the nature of the present invention, and its various features, will appear more fully upon consideration of the various illustrative embodiments now to be described in detail in connection with the accompanying drawings.

*Detailed description*

Figure 1:
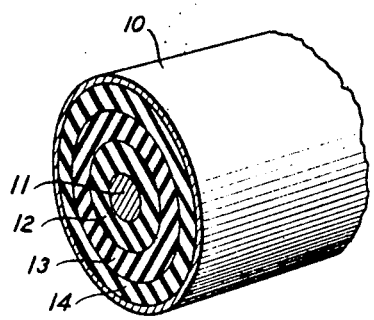
FIG. 1 shows a first illustrative embodiment of the invention using a plurality of concentric dielectric cylinders.

Referring to FIG. 1 there is shown a first illustrative embodiment of the invention comprising a hollow protective enclosure 10 having a circular cross-sectional geometry, within which there is located a plurality of coaxial, optically transmissive cylinders 11, 12, 13 and 14. Cylinders 11, 12, 13 and 14 are made of low-loss dielectric materials such as, for example, mixtures of different glasses, in which the relative amounts of the respective glasses determine the dielectric constant. As an example, glass #0010, manufactured by the Corning Glass Company, comprises a mixture of $$Na_2O—K_2O—SiO_2$$

and has a dielectric constant of about 2.38. Glass #0080, comprises a mixture of $Na_2O—CaO—SiO_2$, and has a dielectric constant of about 2.29. These glasses are miscible and, hence, can be mixed in varying proportions to obtain glasses having a range of dielectric constants between 2.29 and 2.38. These glasses are of particular interest as their coefficients of thermal expansion are approximately equal.

The diameter of the wavepath is large compared to the wavelength of the energy propagating within the enclosure. While a diameter of 100 wavelengths would be typical, it may vary anywhere between 10 wavelengths to thousands of wavelengths, depending upon the frequency of the wave energy and the amount of energy (size of beam) to be propagated.

In accordance with the invention, the dielectric constant of the innermost cylinder 11 is largest, while the dielectric constants of cylinders 12, 13 and 14 decrease in the indicated order.

The absolute values of the dielectric constants are not critical considerations in the design of a waveguide. The significant parameters are the number of cylinders and the difference in dielectric constants between adjacent cylinders. These parameters are selected to achieve the desired energy distribution. For example, as the differences in dielectric constants increase, the propagating wave tends to be more concentrated at the center of the guide where the dielectric constant is largest. Advantageously, however, the wave energy is distributed more uniformly across the guide by making the difference in dielectric constants of adjacent cylinders small of the order of about a percent or two.

Figure 2:
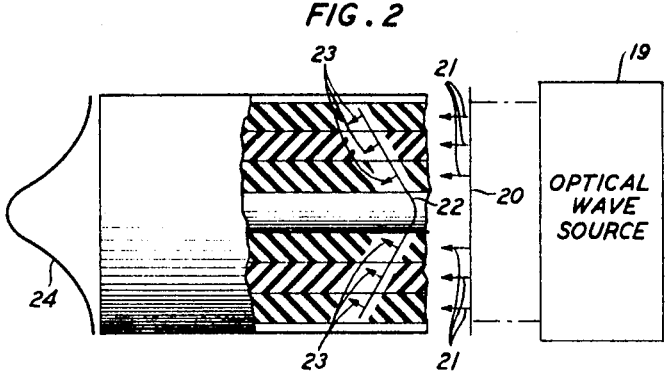
FIG. 2 shows a cross-sectional view of the embodiment of FIG. 1, included for purposes of explanation, showing the effect of the dielectric cylinders upon the wave front of an incident wave.

FIG. 2, which is a longitudinal section of the optical waveguide of FIG. 1, illustrates the effect of the waveguide upon the wave front of an incident wave. As illustrated, a beam of radiant energy, having a plane wave front 20, enters the guide at the right. The beam is derived from a source of optical wave energy 19, such as an optical maser. It should be noted, however, that the invention can also be used to guide incoherent wave energy and is not in any sense limited to the transmission of coherent waves. In addition, the operation of the invention is independent of the direction of polarization of the incident wave.

The arrows 21 indicate the direction of propagation of the incident beam. As the wave propagates through the guide, the wave front is distorted due to the fact that the velocity of propagation of the wave is slowest at the center of the guide and fastest in the region adjacent to cylinder 10. The wave front, accordingly, is bent as indicated by the distorted wave front 22. The direction of propagation, as indicated by the arrows 23, is now toward the center of the guide. The over-all effect of the waveguide upon the distribution of wave energy is to concentrate the beam at the center of the guide. This is illustrated by curve 24 which shows the energy distribution of the wave within the guide. It will be noted that the energy is concentrated about the guide axis and tapers off to a minimum at the outer edges of the guide.

To minimize losses due to mode conversion effects produced by bends in the waveguide, the guide is surrounded by a lossy jacket. This jacket can comprise either a lossy dielectric material, or at optical frequencies, the requisite loss can be introduced by surface treatment of either the outer surface of cylinder 14 or the inner surface of the protective enclosure 10. These various jacket arrangements are illustrated in FIGS. 2A, 2B and 2C.

Figure 2A:
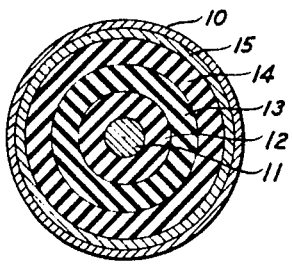
FIGS. 2A, 2B and 2C illustrate various lossy jacket arrangements for minimizing mode conversion effects in a waveguide in accordance with the invention.

In the embodiment of FIG. 2A, a lossy dielectric jacket 15, of skin depth thickness at the operating frequency, is inserted between the outermost low-loss dielectric cylinder 14 and the protective enclosure 10. For millimeter waves, jacket 15 can be made of carbon impregnated polystyrene or polyethylene or any other suitable material. At optical frequencies, jacket 15 can be a glass which is absorbing at the frequency of the wave energy propagating through the guide. Advantageously, jacket 15 has a dielectric constant that is substantially equal to the dielectric constant of cylinder 14.

Figure 2B:
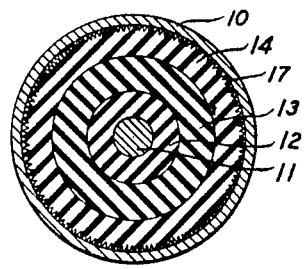

FIG. 2B illustrates an embodiment of the invention in which the outer surface 17 of the low-loss dielectric cylinder 14 is roughened by etching or other means, so that it scatters wave energy incident upon it. This scattering of the wave energy is produced by the discontinuities introduced at the cylinder surface and is electrically equivalent to the loss provided by lossy jacket 15 in FIG. 2A.

Figure 2C:
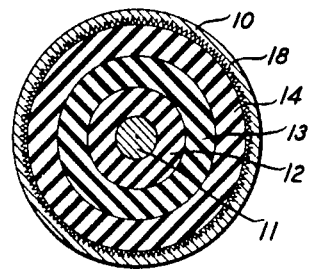

The embodiment of FIG. 2C is a modification of the embodiment of FIG. 2B, in which the scattering is achieved by surfacing treating the inner surface 18 of the protective enclosure 10.

Figure 3:
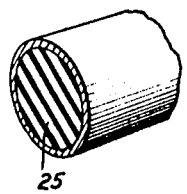
FIG. 3 shows an illustrative embodiment of the invention using a rod of dielectric material having a continuously tapered dielectric constant.

FIG. 3 is an alternate arrangement of the embodiment of FIG. 1, wherein a single cylinder of glass 25 is used whose dielectric constant tapers continuously from a maximum at the center to a minimum at the outer edges. A cylinder of this type is made by the ionic diffusion of a heavy element, such as lead, into a glass cylinder.

In the embodiments of FIGS. 1, 2A, 2B, 2C and 3, the entire wavepath contains solid dielectric material. While the losses associated with such materials are relatively small, they may nevertheless become appreciable over very long distances. In the embodiment of the invention shown in FIG. 4, the losses are substantially reduced by reducing the proportion of solid dielectric material present in the wavepath.

In this embodiment, only a single dielectric cylinder 31, in the form of a circular rod, is used. Rod 31 is coaxially supported within an outer protective cylinder 30 by means of thin radial support members 32. The rest of the space within cylinder 30 is occupied by another low-loss medium of lower dielectric constant, such as air, or the region between rod 31 and cylinder 30 can be evacuated. In addition, a lossy jacket in the form of a lossy dielectric lining in cylinder 30 would also be included if required.

Figure 4:
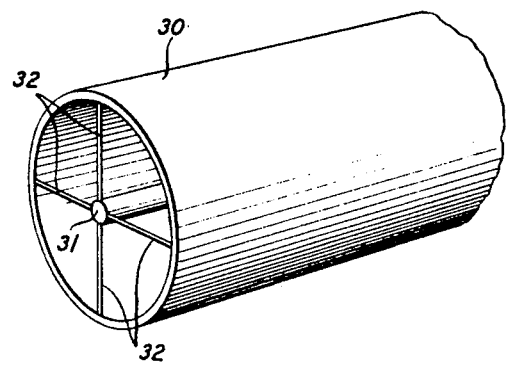
FIG. 4 shows an illustrative embodiment of the invention utilizing a single dielectric rod of uniform dielectric constant.

The operation of the embodiment of FIG. 4 and its design are substantially as described above. It has the advantage that, due to the use of only a single dielectric rod, occupying only a small portion of the transmission region within the enclosure, the losses are correspondingly less.

It has the disadvantage, however, that since only two dielectric materials are used, the degree of control that can be exercised over the energy distribution within the wavepath is also less.

Figure 5:
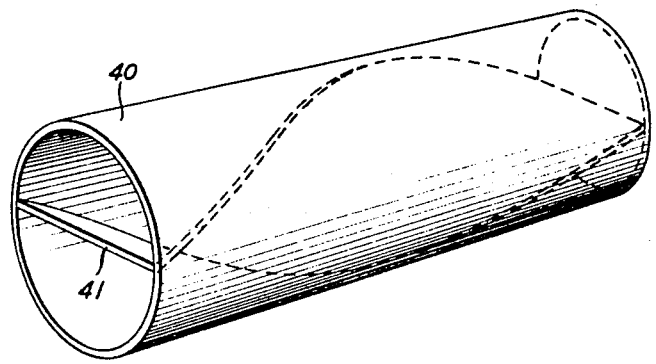
FIG. 5 shows a fourth illustrative embodiment of the invention utilizing a twisted sheet of dielectric material.
Figure 6:
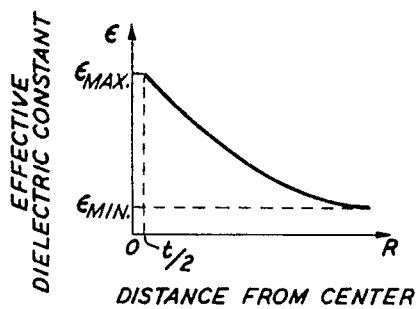
FIG. 6, included for purposes of explanation, shows the variation in the effective dielectric constant as a function of the radial distance from the center of the guide, for the illustrative embodiment of FIG. 5.

FIG. 5 is illustrative of the second class of waveguides in which the desired dielectric constant distribution is effectively obtained by altering the symmetry of the wavepath over an extended longitudinal interval. Referring more specifically to FIG. 5, the waveguide comprises a circular cylinder 40 and a thin sheet of low-loss dielectric material 41. The latter, which extends diametrically across cylinder 40, is twisted about the axis of cylinder 40 as it extends along in the longitudinal direction. Thus, a ray propagating along the guide axis is always in the dielectric material. Away from the guide center, however, a ray parallel to the axis is in the material only part of the time. Hence, such a ray sees a different effective dielectric constant. The variation in the resulting effective dielectric constant along any radius R is as shown in FIG. 6. From the guide center to the edge of the dielectric material, a distance equal to half the thickness, $t$, the effective dielectric constant is $\epsilon_{max}$ the dielectric constant of the material. From the edge of the material, to the inside surface of cylinder 40, the effective dielectric constant decreases to a minimum value $\epsilon_{min}$.

The thickness of the dielectric material and the value of the dielectric constant are determined using the same criteria that were applied to the embodiments of FIGS. 1 and 3. That is, for a given distribution of wave energy, the thickness, $t$, is inversely related to the dielectric constant of the dielectric sheet. As an example, if the sheet has a thickness comparable to a wavelength of the propagating wave, the dielectric constant of the sheet is typically about twice that of the surrounding medium. For a thickness of about 100 wavelengths, it is sufficient if the dielectric constant is about 1.001 times that of the surrounding medium.

The pitch $l$ of the twisted dielectric sheet, or the longitudinal distance along the guide for a 180 degree rotation of the sheet, is determined by considering the distance $b$ over which a radiated beam remains well collimated. In terms of the beam radius, $a$, and the wavelength, $\lambda$, $b$ is given as $$b = a^2/\lambda$$

The pitch $l$ is selected such that $l < b$.

A typical embodiment in which the guide radius is 2.5 centimeters and the wavelength of the guided energy is 0.1 mm., would comprise a dielectric sheet having a thickness of about 0.01 mm. (0.1λ) and a relative dielectric constant of about 2.5. The pitch distance is then of the order of 50 cm. ($l = 0.1b$).

In the embodiments of the invention illustrated in FIGS. 1, 3, 4 and 5, the wavepath has an actual or an effective dielectric constant which decreases from a maximum at the center of the path to a minimum at the edges of the path. This distribution is obtained by loading the wavepath with one or more solid dielectric materials. In each of these embodiments, therefore, the transverse distribution of dielectric constant across the wavepath at any given longitudinal location is also nonuniform.

Because all solid dielectric materials have some finite loss associated with them, their inclusion in a wavepath can give rise to appreciable losses over long distances. In the embodiments of the invention to be described hereinbelow, a tapered distribution in the effective dielectric constant of the wavepath is obtained over an extended longitudinal interval without the use of loading materials. That is, an effective distribution is obtained even though the dielectric constant across the wavepath, at any given location, is uniform. The exclusion of loading materials results in a wavepath that is inherently less lossy.

Figure 7:
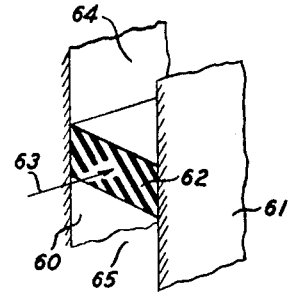
FIG. 7, included for purposes of explanation, illustrates the waveguiding characteristics of a material having a higher dielectric constant than its surrounding.

Before considering these specific embodiments, reference is first made to FIG. 7 which shows a pair of parallel surfaces 60 and 61 separated by means of an optically transmissive dielectric slab 62. An optical beam, directed upon the structure in the direction of arrows 63, will propagate between the surfaces 60 and 61 and will tend to be concentrated within the slab which has a higher dielectric constant than the empty regions 64 and 65 above and below it.

Figure 8:
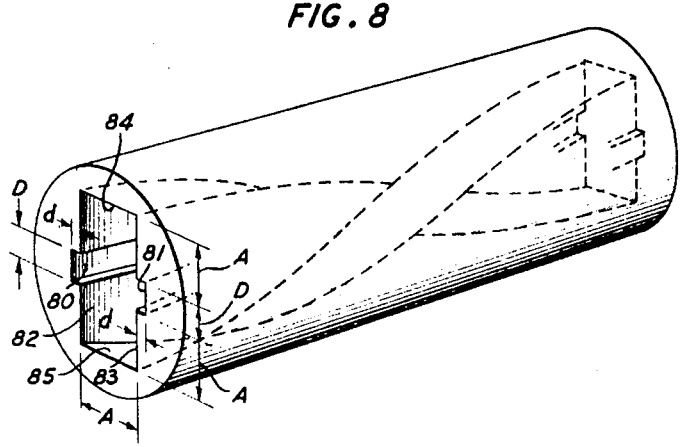
FIGS. 8, 9 and 10 are further illustrative embodiments of the invention utilizing recesses in place of the dielectric sheet of FIG. 5 for effecting the desired variation in dielectric constant within the wavepath.

As the presence of a dielectric material is equivalent to increasing the dimensions of the path, the electrical equivalent of the structure of FIG. 7 is obtained by the embodiment of the invention shown in FIG. 8. In this embodiment, the wavepath comprises a bounded region of substantially rectangular cross-sectional geometry having a pair of grooves or recesses 80 and 81. Specifically, the recesses locally increase the distance, $A$, between opposite surfaces 82 and 83 of the wavepath by an amount $2d$ over an interval $D$. Because the structures of FIGS. 7 and 8 are electrically equivalent, wave energy, applied to the structure shown in FIG. 8 tends to be concentrated within the widened region of the wavepath. Since very little of the wave energy extends above or below this region, the wavepath can be terminated at some distance above and below to form the upper and lower ends 84 and 85. This produces a fully enclosed wavepath.

In the embodiment of the invention shown, the distance $A$ between surfaces 82 and 83 is increased approximately 10 percent over an interval $D$ equal to $A/2$. The distances between the grooves and the upper and lower ends 84 and 85 are equal to at least the distance A. These distances, however, are not critical.

As will be recalled, in the embodiment of FIG. 5 the beam density is controlled by the size and dielectric constant of the dielectric sheet. In a comparable manner variations in the dimensions $d$ and $D$ change the energy distribution and are used, in the design process for that purpose. For example, by tapering the recesses 80 and 81, as illustrated by recesses 90 and 91 in FIG. 9, a greater concentration of wave energy in the region of the recesses is produced.

Figure 10:
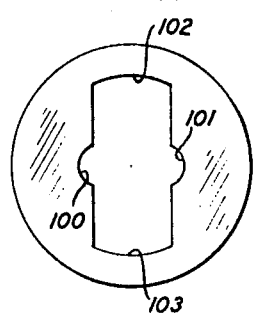

FIG. 10 illustrates another groove geometry. In this illustrative embodiment the recesses 100 and 101 are arcs of a circle. This embodiment also illustrates the fact that the upper and lower ends 102 and 103 can also be curved. Since very little energy exists in these regions, the shape of these ends is not important.

In each of the embodiments the wave energy is concentrated into a beam that has a width to height ratio of about A:D. For some applications this may be a desirable result. For long distance transmission, however, the wave energy is advantageously concentrated so that the field intensity is very low at all of the boundaries of the wave path. To produce such a beam of wave energy, the expedient of twisting the discontinuity, used in the embodiment of FIG. 5, is employed. Thus, in the embodiments of FIGS. 8, 9 and 10, the entire cross-sectional geometry of the wavepath is smoothly and continuously angularly displaced about the longitudinal axis of the wavepath. This longitudinal twisting of the wavepath's cross section about the path axis produces a tapering of the effective dielectric constant of the wavepath from a maximum along the path axis to a minimum at the perimeter of the path. The result is to concentrate the wave energy into a beam that is symmetrical about the path axis, being a maximum along the axis and decreasing to a minimum at the path boundaries.

Because the wave energy is distributed in the manner described above, the material comprising the path enclosure has little effect upon the propagating wave in a straight length of guide and, hence, the enclosure can be made of either conductive or nonconductive material. However, as noted herein above, bends in the wavepath make it desirable to provide the wavepath with a lossy jacket. This may be done in the embodiments of FIGS. 5, 8, 9 and 10 by either lining the protective enclosure with a lossy dielectric material or by surface treating the inner surface of the enclosure so that it scatters wave energy incident upon it.

Figure 9:
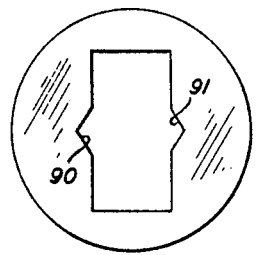

Although the embodiments of FIGS. 8, 9 and 10 are equivalent to that of FIG. 5, the advantages of the former embodiments are lower losses and simplicity of structure.

While the invention has been described with particular reference to optical waves, it is to be understood that the principles taught herein are applicable in all situations in which the wavepath is large compared to the wavelength of the wave energy. This would, therefore, include millimeter waves for which waveguides of two inches are common.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A waveguide for the transmission of wave energy over an extended distance of the order of a hundred feet and greater comprising:
   a hollow enclosure whose cross-sectional dimensions are at least ten times the wavelength of said wave energy;
   transparent transmission means within said enclosure having an effective dielectric constant to wave energy propagating therein which gradually and continuously varies in the transverse direction from a maximum value at the center of said enclosure to a minimum value at the inner surface of said enclosure;
   and lossy means for minimizing mode conversion-reconversion distortion effects disposed between said transmission means and said enclosure extending over the entire length of said waveguide.

2. A waveguide for the transmission of a beam of optical wave energy of radius $a$ and wavelength $\lambda$ comprising:
   an enclosure;
   means for creating a sheet-like region within said enclosure having a dielectric constant that is higher than the dielectric constant of the remaining region within said enclosure;
   said means being twisted along its length about the center of said guide in the direction of wave propagation with a pitch that is less than $a^2/\lambda$.

3. A waveguide for the transmission of electromagnetic wave energy over an extended distance of the order of a hundred feet and greater comprising at least four concentric, transparent, dielectric cylinders surrounded by an outer, lossy jacket for minimizing mode conversion-reconversion distortion effects; the diameter of the outermost cylinder being at least ten times the wavelength of said wave energy;
   said cylinders being contiguous and having dielectric constants which decrease from a maximum for the innermost of said cylinders to a minimum for the outermost of said cylinders.

4. A waveguide for the transmission of a beam of electromagnetic wave energy of radius $a$ comprising:
   a hollow cylinder whose diameter is at least ten times the wavelength of said wave energy;
   and means for establishing an effective dielectric constant across said waveguide which continuously tapers from a maximum at the center of said guide to a minimum at the outer edges thereof, comprising a transparent sheet of dielectric material extending diametrically across and longitudinally along said cylinder;
   said sheet being twisted along its length about the longitudinal axis of said cylinder with a pitch that is less than the ratio $a^2/\lambda$, where $\lambda$ is the wavelength of the wave energy to be propagated within said guide.

5. The waveguide according to claim 4 wherein said cylinder is lined with a lossy dielectric material.

6. The waveguide according to claim 4 wherein the inner surface of said cylinder is adapted to scatter wave energy incident therein.

7. A waveguide for transmitting a beam of electromagnetic wave energy comprising:
   a hollow, bounded enclosure;
   and means for establishing an effective dielectric constant to wave energy propagating therein which varies in the transverse direction from a maximum value at the center of said enclosure to a minimum value at the inner surface of said enclosure comprising a pair of symmetrically located recesses for locally increasing one of the transverse dimensions of said wavepath;
   the cross sectional geometry of said enclosure being smoothly and continuously angularly displaced about the longitudinal axis of said wavepath at successive longitudinal locations with a pitch that is less than the ratio $a^2/\lambda$, where $a$ is the beam radius, and $\lambda$ is the wavelength of the wave energy propagated within said guide.

8. The waveguide according to claim 7 wherein said recesses are rectangular;
   and wherein said one transverse dimension is locally increased by about ten percent.

9. The waveguide according to claim 7 wherein said recesses are triangular.

10. The waveguide according to claim 7 wherein said recesses are circular.

11. The waveguide according to claim 7 wherein said wavepath is bounded by a lossy jacket.

References Cited

UNITED STATES PATENTS

| | | |
|---|---|---|
| 2,595,078 | 4/1952 | Iams. |
| 3,083,123 | 3/1963 | Navias. |
| 3,157,726 | 11/1964 | Hicks et al. _____ 350—96 |
| 3,277,489 | 10/1966 | Blaisdell _____ 343—785 |
| 2,825,260 | 3/1958 | O'Brien _____ 350—96 |

OTHER REFERENCES

Kane et al.: "Low Loss Optical Guided Modes," Journal of the Optical Society of America, vol. 53, No. 4, April 1963, p. 507.

JOHN K. CORBIN, *Primary Examiner.*

U.S. Cl. X.R.

333—95; 343—785